US006501463B1

(12) United States Patent
Dahley et al.

(10) Patent No.: US 6,501,463 B1
(45) Date of Patent: Dec. 31, 2002

(54) ELECTRONIC WHITEBOARD SYSTEM USING A TACTILE FOAM SENSOR

(75) Inventors: Andrew Dahley, San Francisco, CA (US); Victor Su, Berkeley, CA (US); Bjoern Magnussen, Albany, CA (US); Cyril Valfort, Bussy-Albieux (FR)

(73) Assignees: Siemens Technology -to-Business Center LLC, Berkeley, CA (US); Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/504,206

(22) Filed: Feb. 15, 2000

(30) Foreign Application Priority Data

Dec. 10, 1999 (DE) .......................... 198 59 703

(51) Int. Cl.[7] .............................................. G06F 3/033
(52) U.S. Cl. ........................ 345/173; 345/156; 345/162; 345/168; 345/172; 345/174; 345/179; 345/733; 345/734; 345/751; 345/753; 369/1; 707/204; 707/205
(58) Field of Search ................................. 345/156, 162, 345/168, 172, 173, 174, 179, 733, 734, 751, 753; 369/1; 709/204, 205

(56) References Cited

U.S. PATENT DOCUMENTS

| 3,959,585 A | 5/1976 | Mattes et al. |
| 4,322,983 A | 4/1982 | Sado ........................ 73/862.68 |
| 4,455,450 A | 6/1984 | Margolin |

(List continued on next page.)

FOREIGN PATENT DOCUMENTS

| DE | 196 42 615 A1 | 4/1997 |
| DE | 196 47 876 A1 | 4/1997 |
| EP | 56004885 | 1/1981 |
| EP | 0 338 857 | 10/1989 |
| EP | 0 225 008 | 12/1990 |
| GB | 720602 | 12/1954 |
| GB | 2 222 258 A | 2/1990 |
| GB | 2 350 431 | 11/2000 |
| JP | S55-32542 | 7/1980 |
| JP | 56004885 | 1/1981 |
| JP | 58017331 | 2/1983 |
| JP | 61195324 | 8/1986 |

OTHER PUBLICATIONS www.e–beam.com Products, 7 pages total.
www.e–beam.com news/press releases *Electronics for Imaging Debuts eBeam Meeting Serv 2000,* 3 pages total.
Prof. Heinz Wellhausen, *Tastsensor mit Fingerspitzengefuhl,* 2087 Elektronik 40 (Oct. 1991) May 14, No. 1, Munich Gemrany (German language article) translated, 4 pages total.

(List continued on next page.)

*Primary Examiner*—Bipin Shalwala
*Assistant Examiner*—Vincent E. Kovalick (57) ABSTRACT

An electronic whiteboard system using an electronic whiteboard having a foam sensor for measuring the input data drawn onto the whiteboard writing surface. The electronic whiteboard system includes a communications interface that allows the electronic whiteboard to serve as a network appliance. In particular, the electronic whiteboard's interface includes at least a network interface capable of communicating the measured input data, and also audio data in some embodiments, directly via a network to a server or to a networked computer, in response to a request to access a stored electronic whiteboard meeting. In some embodiments, the server stores the input data associated with an electronic whiteboard meeting and in other embodiments the electronic whiteboard has sufficient memory to store the input data of a meeting.

25 Claims, 6 Drawing Sheets

U.S. PATENT DOCUMENTS

| | | | |
|---|---|---|---|
| 4,484,026 A | 11/1984 | Thornburg | |
| 4,492,949 A | 1/1985 | Peterson et al. | 338/114 |
| 4,517,546 A | 5/1985 | Kakuhashi et al. | |
| 4,575,580 A | 3/1986 | Jandrell | 178/18 |
| 4,680,430 A | 7/1987 | Yoshikawa et al. | |
| 4,687,885 A | 8/1987 | Talmage, Jr. et al. | 178/18 |
| 4,826,552 A * | 5/1989 | Breitscheidel et al. | 156/221 |
| 5,060,527 A | 10/1991 | Burgess | |
| 5,274,362 A | 12/1993 | Potvin | |
| 5,311,779 A | 5/1994 | Teruo | 73/726 |
| 5,365,461 A | 11/1994 | Stein et al. | |
| 5,367,130 A * | 11/1994 | Isono | 178/18.02 |
| 5,453,941 A | 9/1995 | Yoshikawa | |
| 5,565,968 A * | 10/1996 | Sawa et al. | 399/286 |
| 5,572,728 A * | 11/1996 | Tada et al. | 345/501 |
| 5,604,485 A | 2/1997 | Lauro et al. | |
| 5,625,833 A * | 4/1997 | Levine et al. | 707/500 |
| 5,708,776 A | 1/1998 | Kikinis | |
| 5,717,879 A | 2/1998 | Moran et al. | |
| 5,786,814 A | 7/1998 | Moran et al. | |
| 5,790,114 A * | 8/1998 | Geaghan et al. | 178/18.03 |
| 5,808,540 A * | 9/1998 | Wheeler et al. | 338/114 |
| 5,838,309 A | 11/1998 | Robsky et al. | |
| 5,838,313 A | 11/1998 | Hou et al. | |
| 5,945,938 A | 8/1999 | Chia et al. | |
| 5,970,455 A | 10/1999 | Wilcox et al. | |
| 5,977,867 A | 11/1999 | Blouin | 340/407.2 |
| 5,986,655 A | 11/1999 | Chiu et al. | |
| 5,995,083 A | 11/1999 | Sato et al. | |
| 5,995,943 A | 11/1999 | Bull et al. | |
| 6,009,240 A | 12/1999 | Eguchi et al. | |
| 6,009,469 A | 12/1999 | Mattaway et al. | |
| 6,072,130 A | 6/2000 | Burgess | 200/86 |
| 6,114,645 A | 9/2000 | Burgess | 200/512 |
| 6,121,960 A * | 9/2000 | Carroll et al. | 345/169 |
| 6,239,790 B1 * | 5/2001 | Martinelli et al. | 178/18.01 |
| 6,323,846 B1 * | 11/2001 | Westerman et al. | 345/173 |

OTHER PUBLICATIONS

Zotefoams plc, MSDS–15 EV CN Grades, Material Safety Data Sheet, 8 pages total.

"Conductive Foam", *Zotefoams plc,* May 1996, p. 1–6.

Advertisement: See Mimio, *Virtual Ink,* 1999.

Ullmer, Brygg A., "Models and Mechanisms for Tangible User Interfaces", Massachusetts Institute of Technology, Jun. 1997, p. 1–83.

Stifelman, Lisa J., "Augmenting Real–World Objects: A Paper–Based Audio Notebook", *CHI,* 1996.

MicroTouch Ibid Technical Summary, *Business & Professional Series,* Nov. 14, 1996.

Ishii, Hiroshi, et al., "Tangible Bits: Towards Seamless Interfaces between People, Bits and Atoms", *CHI,* Mar. 22–27, 1997, p. 1–8

* cited by examiner

ELECTRONIC WHITEBOARD SYSTEM USING A TACTILE FOAM SENSOR

CROSS-REFERENCE TO RELATED APPLICATION

The present application claims priority from German patent application no. 19959703.0, entitled "Taktilsensor" (translation is "Tactile Sensor") listing inventors Bjoem Magnussen and Cyril Valfort, and filed on Dec. 10, 1999.

BACKGROUND OF THE INVENTION

Various position or pressure sensing input devices using tactile sensors have been previously developed. However, these conventional approaches often have been complex, difficult or expensive to manufacture, and/or had limited performance, especially for large area input device applications.

One approach has been to provide a touch surface that is an elastic, air-permeable sensor material sealed by an airtight cover to provide an airtight region, wherein atmospheric pressure sensors are installed. A pressure contact by an object toward the touch surface changes the internal pressure within the airtight region, such that the atmospheric pressure sensors can measure the pressure change associated with the force of the contact. However, this approach cannot determine the position of the contact.

Another approach is to have a touch surface covered with a sensitive thin material that can detect a contact using capacitive or piezo-electric measurement principles. Being fairly expensive and complicated to manufacture, this approach is typically used for higher-end position sensing devices covering a small area, such as for a touchpad input for portable computers.

Yet another approach is to use two resistive or conductive materials in the touch surface in order to measure a contact using resistive measurement principles. For example, a foil print sensor that includes a conductive plastic material mounted on an interdigital electrode comb structure can provide a resistive measurement between proximate electrodes of the comb structure, as an increased pressure from a contact on the touch surface results in a decreasing resistance (between these particular electrodes) that is measured to provide a location of the contact. Foil print sensors are, however, expensive to produce. Other examples include digitizing input tablets proposed in U.S. Pat. No. 3,959,585 issued to Mattes et al., in U.S. Pat. No. 4,455,450 issued to Margolin, and in U.S. Pat. No. 4,517,546 issued to Kakuhashil. In the types of digitizing tablets discussed by Mattes et al. and by Margolin, a first resistive sheet having x-direction measuring electrodes and a second resistive sheet having y-direction measuring electrodes have a separation maintained between each other by a pressurized air gap or other generally non-conducting material. When a contact is made onto the touch surface, the resistive sheets come into closer contact with each other to result in a decreasing resistance that can be measured in the x and y directions to determine the location of the contact. In the type of digitizing tablet discussed by Kakuhashi et al., a first multi-layer resistive sheet having x-direction measuring electrodes and a second multi-layer resistive sheet having y-direction measuring electrodes sandwich an elastic, pressure-sensitive conductive sheet. When a contact is made onto the touch surface, the resistive sheets are contacted electrically together through the conductive sheet. Involving various steps and technical processes to provide the multi-layer resistive sheets, film electrodes, and insulative bonded layers discussed therein, the construction of such a device is complicated and expensive. For larger area input devices, the processes involved in construction become unrealistic, as well as costs becoming excessive. Even with larger area input devices such as an electronic whiteboard using a conventional resistive membrane technology such as discussed in U.S. Pat. No. 5,790,114 issued to Geaghan et al. and assigned to Microtouch Systems, Inc., the need to sustain the gap between the resistive sheets of the resistive membrane technology can result in a complicated mechanical apparatus, such as described in U.S. Pat. No. 5,838,309 issued to Robsky et al. and also assigned to Microtouch Systems, Inc. However, providing a consistent gap appears to be crucial for obtaining consistent measurements for these types of large area input devices.

In addition to the various disadvantages to the conventional approaches discussed above, many large area input devices also have required dedicated, expensive computer and video equipment in order to provide broader communication of the input information beyond the one room where such a device may be located. For example, as discussed in U.S. Pat. No. 5,790,114 mentioned above, the electronic whiteboard system has a direct connection to a dedicated computer with monitor to view the input information written on the whiteboard. Other electronic whiteboard systems further require expensive optical scanner equipment in addition to a dedicated computer with monitor, as illustrated in U.S. Pat. No. 6,009,240 issued to Eguchi et al. Besides being expensive and unaffordable to many potential electronic whiteboard purchasers, this extra computer and video equipment used with a particular electronic whiteboard takes up physicals space and can be bulky to move if this type of equipment is a limited resource and is desired to be used with another electronic whiteboard in a different room.

It is seen from the above that an alternative approach to larger area electronic whiteboards that provide consistent measurements for determining contact location in an economic and simplified manufacturing process is desirable. Further, it is desirable to have an economic, less bulky approach to broadly utilizing an electronic whiteboard for wide communication.

SUMMARY OF THE INVENTION

According to a specific embodiment, the present invention provides an electronic whiteboard that includes a foam sensor with a plurality of electrodes, and an erasable writing surface disposed on top of the foam sensor. The erasable writing surface has an input area. The electronic whiteboard also includes circuitry, coupled to the electrodes, that measures pressure and position data of a contact made to the input area of the writing surface.

In accordance with another specific embodiment, the present invention provides an electronic whiteboard network appliance. The electronic whiteboard network appliance includes a sensor with a plurality of electrodes; an erasable writing surface disposed on top of the sensor that has an input area to which a contact having pressure and position data may be made; an audio input such that audio data is synchronized with said pressure and position data; circuitry coupled to the electrodes and audio input; and a network interface. The circuitry measures the pressure and position data of the contact, and synchronizes the audio data to the measured pressure and position data. The network interface is coupled to the circuitry and transmits the measured pressure and position data with synchronized audio data within network packets to a network for use at a network device.

In accordance with another specific embodiment, the present invention provides an electronic whiteboard meeting system over a network. The system includes an electronic whiteboard encoding system having a network interface, a network server connected to the network, and a plurality of devices logically connected to the network. The electronic whiteboard encoding system measures position data from contacts made during an electronic whiteboard meeting to a writing surface of the electronic whiteboard encoding system, and transmits the position data in network packets via the network interface to the network. The network server is installed with serve software capable of reading and storing the position data for transmission over the network. At least one device of the plurality of devices is provided with client software capable of accessing and translating the position data from the network server into a representation of the electronic whiteboard meeting.

These and other various specific embodiments of the present invention as well as their features and advantages are described in more detail in conjunction with the following drawings.

DETAILED DESCRIPTION OF SPECIFIC EMBODIMENTS

The present invention provides an improved electronic whiteboard system that provides an electronic whiteboard that is more economical and less complicated to manufacture than prior electronic whiteboards.

Figure 1:
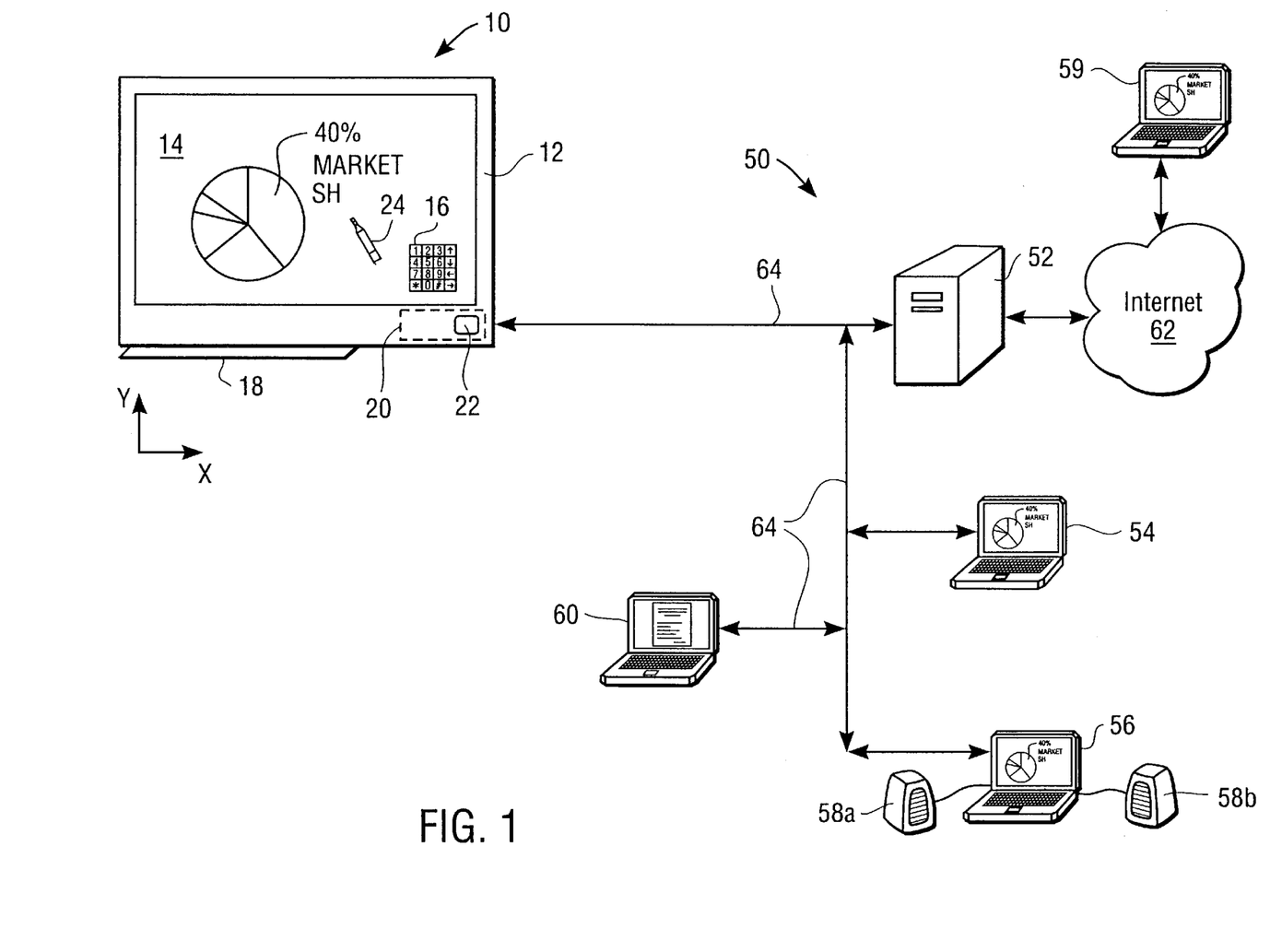
FIG. 1 illustrates the electronic whiteboard system that includes an improved electronic whiteboard 10 directly connectable to a network 50 according to a specific embodiment of the present invention.

In accordance with a specific embodiment, FIG. 1 illustrates the electronic whiteboard system, which includes the electronic whiteboard 10, and a network 50. Electronic whiteboard 10 includes a frame 12, a writing surface 14 having an imprinted keypad 16 thereon, a pen tray 18, and control system 20 (described further below). System 20 of electronic whiteboard 10 includes processing and control circuitry, memory and an appropriate network interface. System 20 thus provides a data channel connecting directly to a network port to access network 50. The network interface is integrated into electronic whiteboard 10 in a specific embodiment. The network interface can in some embodiments be a removable module which can optionally be replaced by other plug-in communication modules. These other modules could enable the data channel to be provided over an RS-232 serial interface, a Universal Serial Bus (USB) interface, a wireless RF channel interface, or other interface. According to another alternative embodiment, the removable module can include a network interface as well as a combination of multiple types of interfaces.

Further in some specific embodiments, electronic whiteboard 10 includes an audio microphone (alternatively, a microphone input jack) 22 for receiving audio input that is synchronized to the input information written on writing surface 14. The input information written on writing surface 14, which is an erasable surface, is produced from the pressure and contact by a typical dry-erase pen 24 or other object like a finger.

The configuration of network 50 shown in FIG. 1 is merely an example of a possible network. Network 50 includes a server 52 and locally networked devices 54, 56 and 60, which may be computers, personal digital assistants (PDAs), digital phones with mini-screen, or the like. Network device 56 includes speakers 58a and 58b. In addition, network 50 also can include a remotely networked device 59 logically connected via Internet 62 connected to server 52, which then can serve as a web server. Lines 64 represent the logical network connections in network 50. Therefore, it is understood that network 50 may be a wired network (e.g., Ethernet (10 Mbps/100 Mbps), Token Ring, Gigabit Ethernet) or wireless network, or a combination thereof.

As seen generally in FIG. 1, the data representing the pressure and contact location made by writing instrument 24 on writing surface 14 is measured by electronic whiteboard 10. The data representing the markings (e.g., pie chart indicating business market share) made by a user on writing surface 14 of electronic whiteboard 10 can be transmitted and stored on a network server 52 that can be accessed by the various network devices for substantially concurrent or real-time viewing of the markings on electronic whiteboard 10 (for whiteboard conferencing to multiple network viewers) or for subsequent viewing whenever convenient for a particular networked viewer. For example, a viewer at network device 54 can watch the markings in real time made on the electronic whiteboard 10, which might be remotely located (over a local area network or a wide area network) (a viewer at remote device 59 similarly can watch the markings over the Internet 62). Similarly, a viewer at network device 56 which includes speakers 58a and 58b can watch the markings as well as any audio that synchronizes with the markings made on electronic whiteboard 10. Economically, the present electronic whiteboard system does not require a dedicated computer or expensive video/optical/camera equipment and can utilize an existing network server 52 that is normally used for other non-whiteboard applications.

Electronic Whiteboard

Figure 2A:
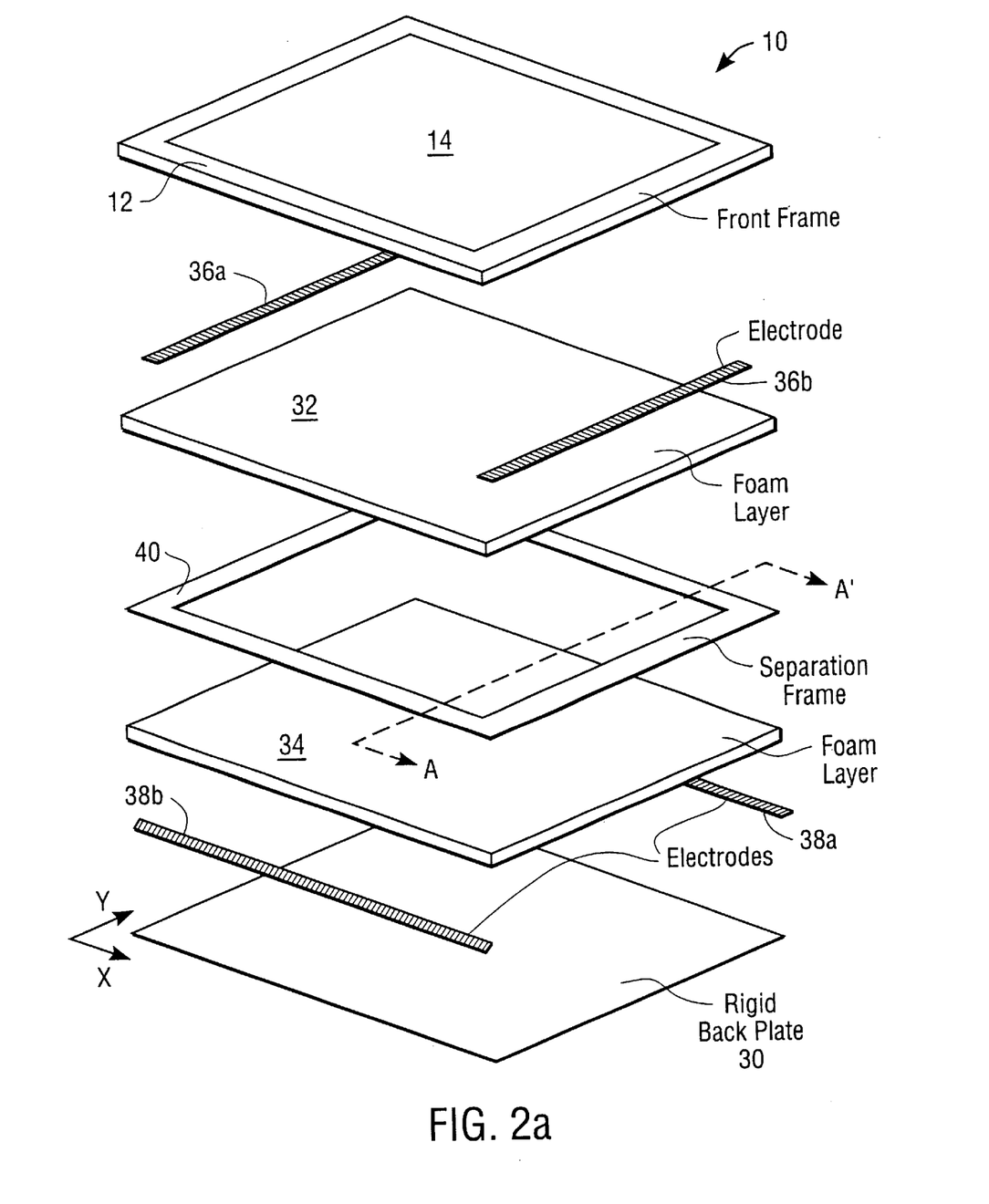
FIG. 2a is an exploded view of the general structure of electronic whiteboard 10 in accordance with a specific embodiment of the invention.
Figure 2B:
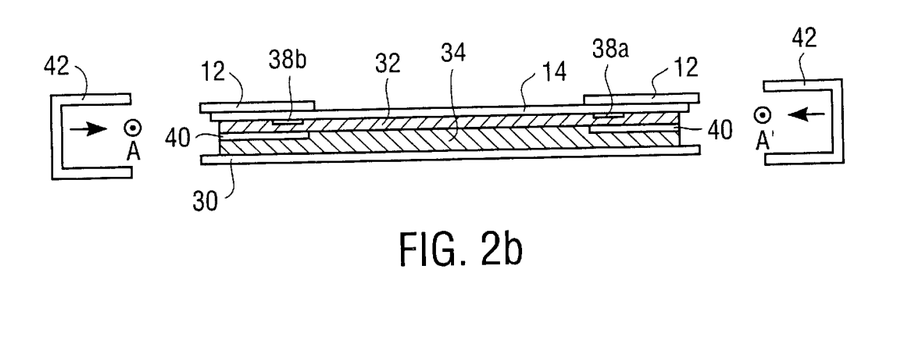
FIG. 2b is a side section view of the general structure of electronic whiteboard in accordance with a specific embodiment of the invention.
Figure 3:
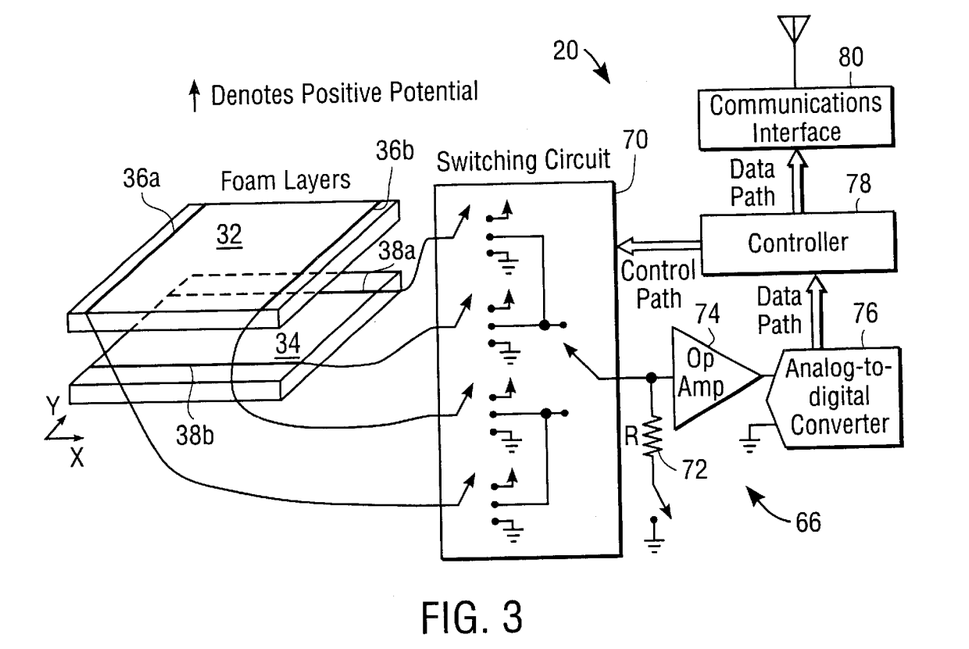
FIG. 3 is a general circuit diagram of the pressure and contact location measurement performed by control system 20 of electronic whiteboard 10 in accordance with a specific embodiment of the invention.
Figure 4:
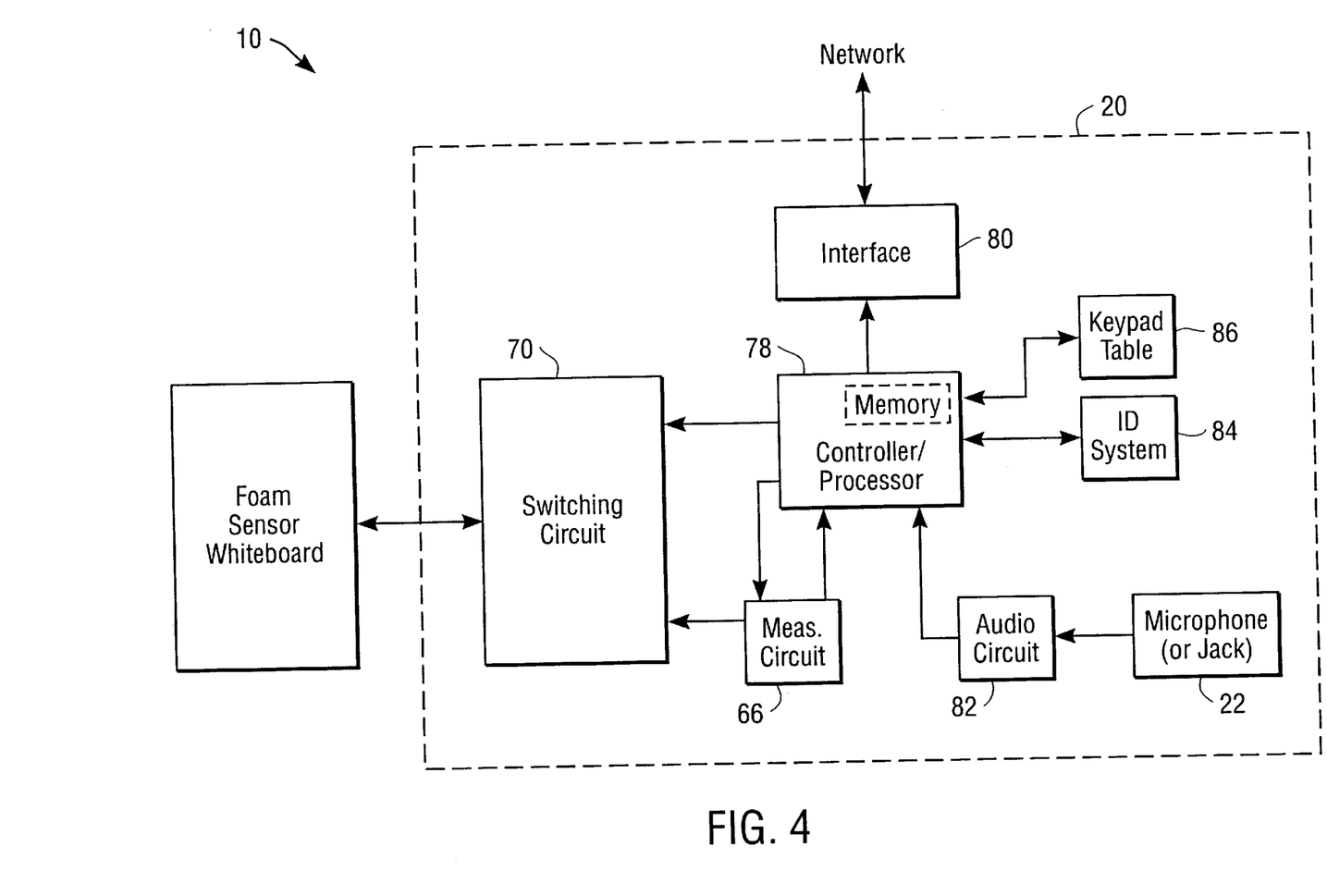
FIG. 4 is a general functional block diagram of the control system 20 of electronic whiteboard 10 in accordance with another specific embodiment of the invention.

A more detailed description of the structure and operation of electronic whiteboard 10 is provided in conjunction with FIGS. 2a, 2b, 3 and 4. In accordance with a specific embodiment, FIG. 2a is an exploded view of the general structure of electronic whiteboard 10, and FIG. 2b is a side section view of the general structure of electronic whiteboard. FIG. 3 is a general circuit diagram of the pressure and contact location measurement performed by control system 20 of electronic whiteboard 10 in accordance with a specific embodiment of the invention. FIG. 4 is a general functional block diagram of the control system 20 of electronic whiteboard 10 in accordance with another specific embodiment of the invention (some portions of which may be optional, as discussed below).

As seen in FIGS. 2a and 2b, electronic whiteboard 10 has a front frame 12 that is connected on its back side to the outer perimeter of the front side of writing surface 14. Writing surface 14 may be a flexible writing surface, such as a paper or plastic sheeting material coated with a dry-erasable laminate. Front frame 12 and rigid back plate 30 are coupled to sandwich together the various interior measurement layers of electronic whiteboard 10. Rigid back plate 30 is a board made of rigid material such as a sturdy plastic. These interior measurement layers include two parallel layers of resistive foam material held in slight tension such that the overall baseline contact between the two foam layers is minimized. In particular, a first foam layer 32 having parallel opposite electrodes 36a and 36b at its edges is adjacent to the backside of writing surface 14. A second foam layer 34 having parallel opposite electrodes 38a and 38b orthogonal to electrodes 36a and 36b adjacent to the front side of back plate 30. First foam layer 32 and second foam layer 34 overlap such that an area common to both layers is provided under writing surface 14. Disposed between first and second foam layers 34 and 36 is a perimeter separation frame 40, which provides in combination with front frame 12 and back plate 30 slight tension to the foam layers such that the overall baseline contact between the two foam layers is minimized both in the writing area and in the perimeter area. Perimeter separation frame 40 is made of electrically isolating material, such as plastic. In other embodiments, perimeter separation frame 40 is optional and may be omitted or replaced with four separating corner members that provide the electrical isolation between the corner locations of the foam layers where the electrode pairs generally overlap. The various layers of electronic whiteboard 10 shown in FIG. 2a would be fastened with edge and/or corner clamping border frames 42, such as shown in FIG. 2b (not shown in FIG. 2a), or other fastening mechanism. In addition, the various layers of whiteboard 10 could be internally clamped in various locations along the perimeter edges for added security.

Each of the foam layers 32 and 34 is preferably an elastomer foam. A closed-cell and conductive elastomer foam material having a volume resistivity ranging from about 2500 ohm-cm to 10,000 ohm-cm (approximately 5000 ohm-cm in a specific embodiment) and a density of up to about 0.2 gm/cm$^3$ (about 5 lbs/ft$^3$ in a specific embodiment) can be used. The interlayer resistance measured between foam layers 32 and 34 in a pressureless state is very high with a value on the order of 10$^7$ ohms. When pressure is applied to the foam layers, the resistance is reduced to a value on the order of 10$^3$ ohms. The foam material is durable, inert, impact-resistant, and deformable. The foam material is easily handled, cut and manipulated to be provided with electrodes (as discussed further below). Thus, the electronic whiteboard of the present invention has a much simplified, economic manufacturing process compared to other prior approaches to electronic whiteboards.

Figure 6:
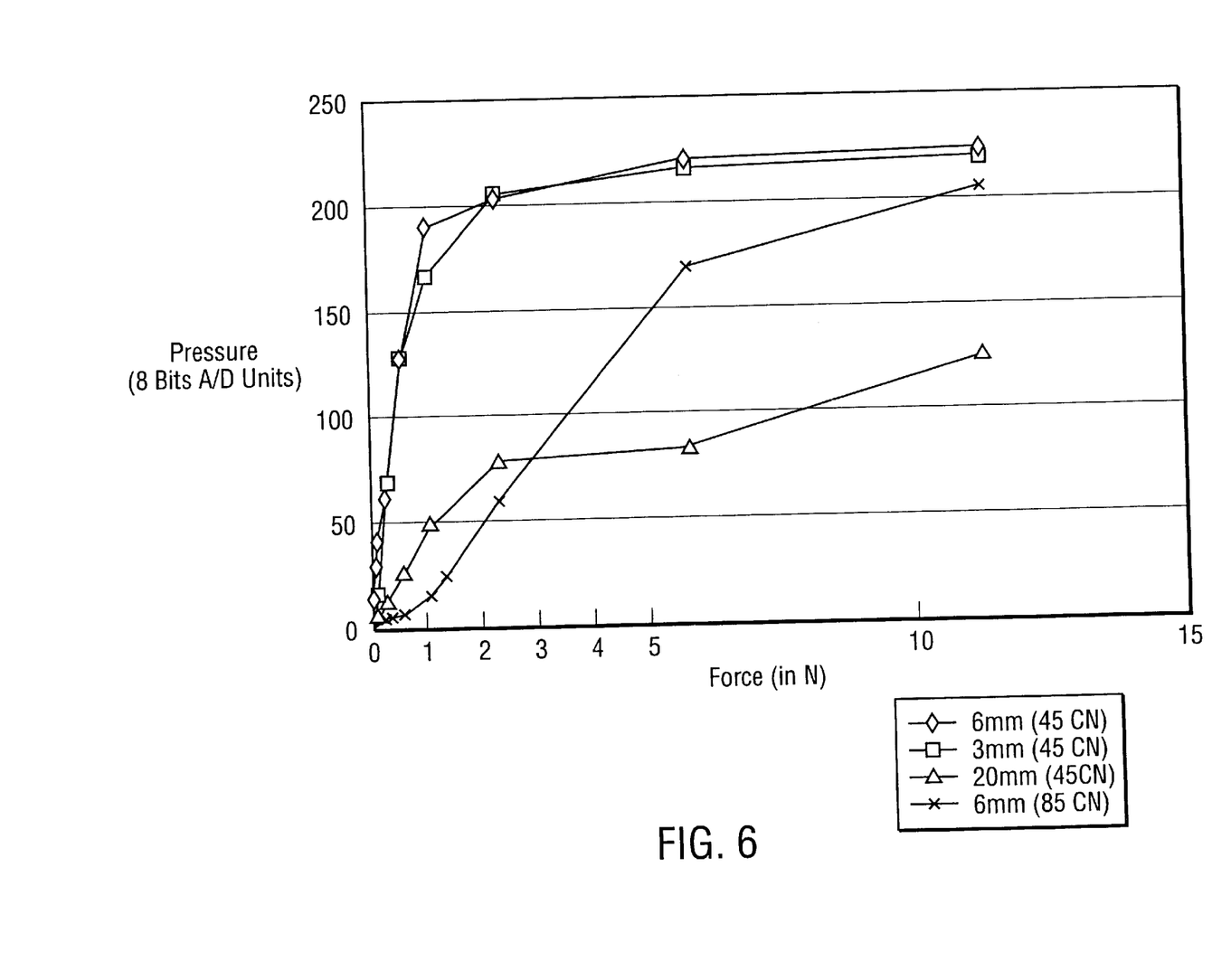
FIG. 6 shows generally the relation between pressure (8 bits A/D units) and force (Newtons) for a sensor signal of a foam sensor having two Evazote foam layers of varying thickness (in mm) and density (in CN)) in accordance with the invention.

In accordance with the present invention, foam layers 32 and 34 are made generally of conductive foam, and more particularly conductive, cross-linked VA copolymer foam, such as the Evazote product family of foam material available from Zotefoams Inc. In specific embodiments, model nos. EV45CN or EV70CN Evazote foam material can be used. In accordance with specific embodiments, foam layers 32 and 34 each has a thickness of about 1–10 mm, preferably about 2–4 mm, and most preferably about 2.5 mm. For a specific embodiment, the electronic whiteboard has about a 1.2 m×0.9 m writing surface area for foam layers 32 and 34 of about 1.3 m×1.0 m, but other dimensions may be used in other embodiments. The size and thickness of the foam layers used influences the accuracy of measurement and signal sensitivity, and the responsiveness can be adjusted by the design of the dimensions of the foam layers and the electrical circuitry used. For example, a foam sensor having a size of about 1 m×0.7 m and using two foam layers has a typical measurement accuracy of about ±1% (or better through filtering for noise reduction). FIG. 6 shows generally the relation between pressure (8 bits A/D units) and force (Newtons) for a sensor signal of a foam sensor having two Evazote® foam layers of varying thickness (in mm) and density (in CN)). The analog signal from the A/D converter input corresponds to a pressure signal (measured from the foam sensor) that is converted into a digital 8-bit signal ($2^8$=256 values), referred to as 8 bits A/D units in FIG. 6. Thus, different size electronic whiteboards would have correspondingly reduced foam layer sizes, with foam thickness and electrical circuitry being optimized accordingly for performance.

Electrodes 36a and 36b are used to measure a contact location and pressure in the x direction, and electrodes 38a and 38b are used to measure the contact location and pressure in the y direction. The electrodes can be pairs of copper or other conductive material applied to the opposite edges of the respective foam layer. For example, the electrodes can be strips of copper tape (for example, about 10–1000 micrometers thick, and about 1–1000 mm wide) contacting the surface of the foam layer and clamped or otherwise held under pressure such that good electrical contact to the foam layer is maintained. As another example, the electrode can be stainless steel or other conductive thread (or thread mesh) that is sewn into the opposite edges of the foam layer. Multiple strands of about 22–40 gauge stainless steel conductive thread, such as available from Bekaert Fibre Technologies, could be used in some embodiments. With this type of electrode, there can be higher electrical resistance as a result of the lower conductivity of the conductive thread and the higher resistance at the interface of the electrode and the foam, and this higher electrical resistance must be accounted for in the measurements.

FIG. 3 is a general circuit diagram of the pressure and contact location measurement performed by control system 20 of electronic whiteboard 10 in accordance with a specific embodiment of the invention. It is noted that foam layers 32 and 34 are shown in FIG. 3 as separated and without separation frame 40, in order to simplify the demonstration of the lack of electrical contact between the pairs of electrodes. As mentioned above for a specific embodiment, the two foam layers 32 and 34 are positioned, optionally with separation frame 40 or equivalent, such that the two orthogonal pairs of electrodes (one pair on each layer) have or minimal electrical contact between those pairs.

FIG. 4 is a general functional block diagram of the control system 20 of electronic whiteboard 10 (some functions are optional). As seen in both FIGS. 3 and 4, control system 20 includes a measuring circuit 66, a switching circuit 70 connected to the foam sensor whiteboard, a controller/processor 78 (which may have embedded memory and/or additional external memory available), and a communications interface 80. Controller/processor 78 may be, for example, an Intel-based processor, a digital signal processor, or a microcontroller, depending on the supported features of the electronic whiteboard. Control system 20 also is provided with power adapter circuitry coupled to a power source, which may be from a battery within electronic whiteboard 10 or from a wall/floor power outlet. As mentioned above, communications interface 80 of electronic whiteboard 10 receives from controller 78 the pressure and position data from measuring circuit 66 (and optionally the synchronized audio data from audio processing circuit 82 and microphone 20) and using the appropriate network protocol sends the data to the network. According to some embodiments, control system 20 also includes an identification system 84 that can be used to identify marker colors and/or erasers, and/or a keypad look-up table 86 that can be used by controller 86 to determine whether a contact corresponds to a key input to keypad 16.

As seen in more detail in FIG. 3, the control system 20 contains switching circuitry 70 that allows each electrode to be connected to either a voltage potential, electrical ground, or the input of the measurement circuitry 66. A fixed resistance 72 can also be connected and disconnected from each electrode. The measurement circuitry 66 includes a high-impedance buffer operational amplifier 74, and an analog-to-digital converter 76. A controller 78 collects the measured data sampled by analog-to-digital converter 76, performs threshold detection and digital filtering, and transmits the pressure and two-axis position data via a communications interface 80 to server 52 for storage and eventual display on network devices. In embodiments where audio data is also input to microphone 22 (and converted from analog to digital form in audio circuit 82) in electronic whiteboard 10, controller 78 also performs time synchronization of the audio data to the measured position and pressure data input on writing surface 14 and compresses and transmits the synchronized audio via communications interface 80. For example, the controller would have the ability to time-stamp the audio data recorded to provide synchronization to facilitate the use of the electronic whiteboard system as a meeting annotation device.

The measurement of the data input on writing surface 14 is described further herein. As seen from switching circuit 70, each of the particular electrodes can be connected to either a given electrical potential, to ground, or to an input of measurement circuit 66. Controller 78 provides control signals to switching circuitry 70 to cause various switch connections, as discussed below, to occur such that two-axis measurements are made. Electrical current is applied to one foam layer 32 by connecting one electrode (e.g., 36b) of a pair to electrical ground and the other electrode (36a) of the same pair to a given electrical potential. An electrical gradient is thereby established through, for example, foam layer 32 between the two electrodes 36a and 32b. Since the electrical resistance of the foam material is macroscopically uniform and linear, electrical potential will vary linearly as a function of distance between the electrodes. In other words, the electrical potential will fall linearly from a maximum at the electrode driven at the given potential to zero towards the electrode connected to electrical ground. Any point lying on a line parallel to the pair of electrodes on a foam layer will have the same potential. When pressure is applied by writing instrument 24 at a point on writing surface 14, that surface 14 will impart that pressure upon the two foam layers 32 and 34 beneath. Rigid back plate 30 provides a counter force so that the two foam layers will be compressed at the point of applied pressure. If foam layer 32 is electrically driven in the manner described above, then the electrical potential at the point of applied pressure will be impressed upon the other foam layer 34. This electrical potential may be measured with the electrodes 38a, 38b of foam layer 34, provided that the input impedance of the measurement circuit, particularly the input operational amplifier 74, is sufficiently high. In particular, controller 78 sends appropriate control signals to switching circuit 70 such that electrodes 38a and 38b are connected to the input of measurement circuit 66. Having a sufficiently high input impedance of measurement circuit 66 is necessary, since the electrical resistance of a foam layer as measured between its two electrodes tends to be in the order of tens of thousands of ohms, and the resistance between the two foam layers varies between this range and a value in the order of tens of millions of ohms as a function of the applied pressure. The sum of these two resistances (resistance of a foam layer, and resistance between the foam layers) must be sufficiently small compared to the input impedance of the measurement circuitry to obtain an accurate reading with the electronic whiteboard 10.

The measurement procedure described above provides position reading in one axis, for example the x-axis. By switching the roles of the two foam layers, that is, by applying electrical current (e.g., switching electrode 38a to connect to an electrical potential and electrode 38b to ground) to foam layer 34 previously connected to measurement circuitry 66 and switching the measurement connection (e.g., switching electrodes 36a and 36b to the input of measurement circuit 66) to foam layer 32 previously driven, a position reading in the other axis, for example the y-axis, may be obtained in a similar manner. Thus, the x-y coordinate position of the contact is measured, in accordance with a specific embodiment. In accordance with specific embodiments having an imprinted (e.g., silk-screened) keypad (or keyboard, etc.) 16 on writing surface 14 of electronic whiteboard 10, contacts made to particular regions corresponding to a particular key would be translated into the appropriate control (e.g., up, down, left, right, #, *) or input number (0, 1, 2 . . . 9) signal and provided to controller 78 in control system 20. Controller 78 can check with a separate keypad interface look-up table 86 for such correspondence, or the functionality of module 86 can be integrated into controller 78.

As mentioned previously, the resistance between the two foam layers varies as a function of the applied pressure. By connecting a resistance 72 of fixed value between the pair of electrodes of one foam layer and electrical ground, and applying a given electrical potential to both electrodes of the other layer, a voltage proportional to the applied pressure is produced. By applying an appropriate threshold electrical potential, this proportional voltage may be used to determine if a contact has been made on writing surface 14.

The amount of current that flows between a pair of two electrodes on a given layer, for example, between electrodes 36a and 36b on foam layer 32, may be obtained by connecting one electrode (36a) to a positive potential and connecting the other electrode (36b) to electrical ground through fixed resistance 72 and measuring the voltage potential at electrode 36b. The amount of current flow provides information about the shape and size of the pressure applied to the two foam layers 32 and 34. As the pressure increases, and hence the contact area between foam layers 32 and 34 increases, the electrical resistance between electrodes 36a and 36b decreases. The amount of current flow therefore allows the system to determine the amount of contact between the two foam layers 32 and 34 and thus to determine the size of the contact and whether multiple contacts exist between foam layers 32 and 34. This information may be used to distinguish a dry-eraser marker 24 from an eraser, for example, of whether two contacts are present between foam layers 32 and 34. Multiple contacts to the foam sensor would result in an inaccurate position reading, and determining an occurrence of possible multiple contacts could prompt a warning to cause the user to re-enter the information on the whiteboard with only one contact (the whiteboard could be equipped with a LED warning indicator, or an audio speaker for a verbal warning).

It is noted that additional details of the operation, construction, and applications of the foam sensor according to various embodiments are discussed in commonly-owned U.S. patent application Ser. No. 08/627,456, entitled "Tactile Sensor Apparatus and Methods" (and commonly claiming priority from German patent application no. 19959703.0, entitled "Taktilsensor" (translation is "Tactile Sensor") listing inventors Bjoern Magnussen and Cyril Valfort, and filed on Dec. 10, 1999) and listing inventors Bjoem Magnussen, Cyril Valfort, Andrew Dahley and Victor Su, filed concurrently herewith, and herein incorporated by reference in its entirety.

In accordance with another specific embodiment of the present electronic whiteboard system, electronic whiteboard 10 can be installed with system 84 that has the ability to determine the identity or nature of the instrument pressed against writing surface 14. For example, such a system's electronics could be included within the body of pen tray 18 (or even integrated as part of control system 20) and logically connected to control system 20. As discussed above, a writing instrument 24 such as a dry-erase marker can be used for writing onto the electronic whiteboard and inputting corresponding data that is then measured. In the case of the dry-erase marker, the color of the marker used may be uniquely identified, by using a known radio frequency (RF) identification tag system that uses passive tags (such as in the form of an adhesive sticker) located on the marker. Alternatively, active RF tags may be used. However, the nature of the instrument used with the whiteboard may vary in that it may also be an eraser, or a finger or other non-marking pointed object. The contacts made by such instruments also can be measured in a similar manner as discussed for writing instrument 24. If the RF identification tag system is enabled, the use of markers would be input information that is normally measured; whereas, non-marker objects such as an eraser would not have passive tags and the use of an eraser would provide input information that is normally measured but indicated as an erasure of previously existing data that was written. Alternatively, a different tag identification can be used for each of the various types of instruments and attached to the corresponding correct marker color, or eraser, or stylus. If no object is detected the user is assumed to be using his finger which is then considered a black pen, or just a cursor control, by the system.

Electronic Whiteboard Meeting System

As discussed earlier with regard to FIG. 1, the electronic whiteboard system of the present invention includes the electronic whiteboard 10 as discussed above that is directly connectable to network 50 having a server 52 and network devices, such as computers 54, 56 and 60 or other devices. The system provides a more economic way to provide an electronic whiteboard meeting where the data representing the markings (e.g., pie chart indicating business market share) made by a user on writing surface 14 of electronic whiteboard 10 can be transmitted and stored on a network server 52. The whiteboard meeting can then be accessed by the various network devices for substantially concurrent viewing of the markings on electronic whiteboard 10 (for whiteboard conferencing to multiple networked viewers) or for subsequent viewing whenever convenient for a particular networked viewer. Economically, the present electronic whiteboard system does not require a dedicated computer or expensive video/optical/camera equipment and can utilize an existing network server 52 that is normally used for other non-whiteboard applications.

Figure 5:
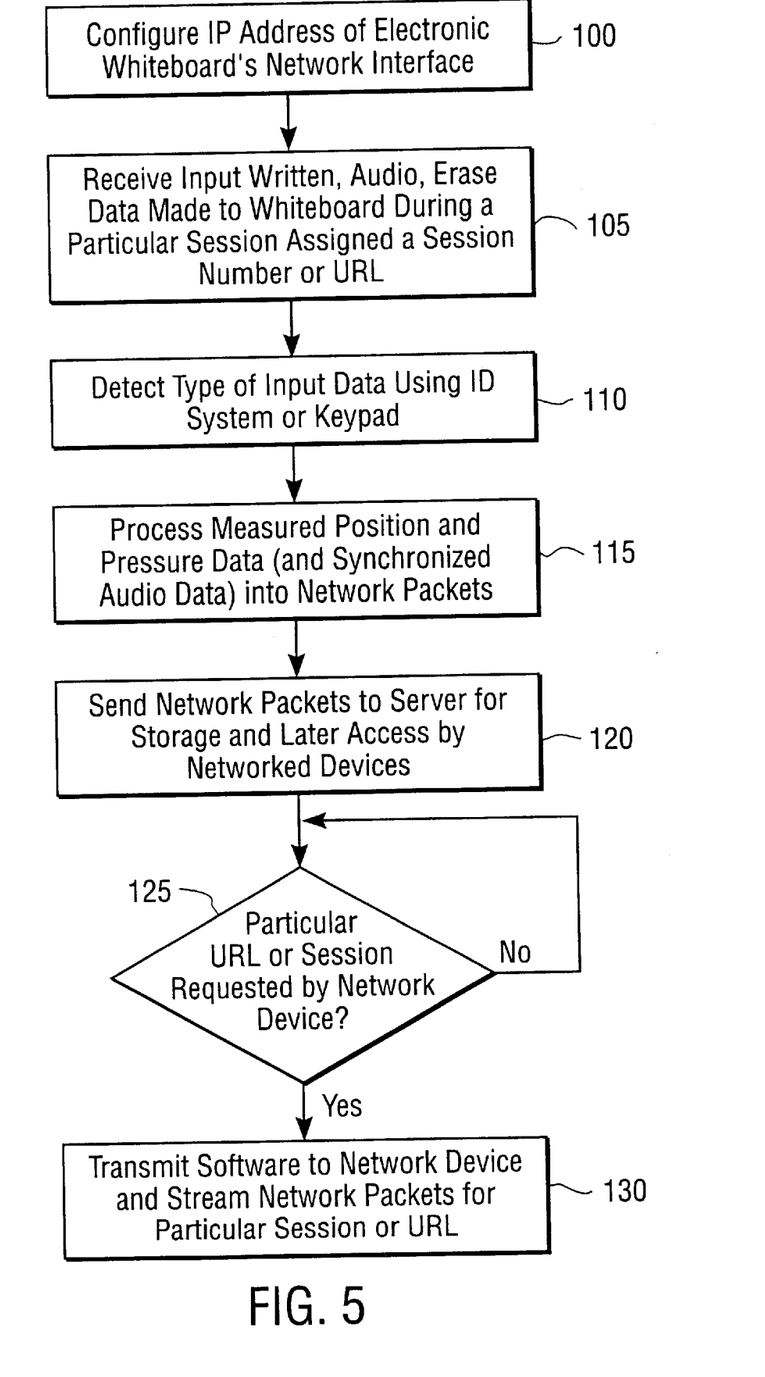
FIG. 5 is a flowchart illustrating the general process for using electronic whiteboard 10 as a network appliance for widespread meeting presentations, in accordance with a specific embodiment.

FIG. 5 is a flowchart illustrating the general operation of the electronic whiteboard used as a network appliance for shared electronic whiteboard meeting presentations. In such applications, configuration of the electronic whiteboard will be required in some cases. When electronic whiteboard 10 is used as a network appliance, a unique Internet Protocol (IP) address for whiteboard 10 will need to be set in a step 100. The graphic key pad (such as seen in FIG. 1) 16 that is applied to writing surface 14 of whiteboard 10 can be used by a system administrator or other authorized person to input the IP address, which is then stored in memory of control system 20. Preferably, keypad 16 is shaded a light gray so as to be easily ignored when the board is viewed at any distance, yet visible up close if the user needs to configure an IP address for whiteboard 10. There can be a button to activate the button graphic as a keypad input device, or a predetermined number code followed by a # sign (or some similar access method) can be used to activate the keypad.

In accordance with a specific embodiment, a combination of data (pressure and contact measurements, synchronized audio) is input from the foam sensor and microphone during the whiteboard meeting in a step 105. In addition, the particular electronic whiteboard session can be assigned (either by inputting session number into keypad 16, or by arbitrarily assigning a session number or URL at server 52). The electronic whiteboard, in some embodiments, optionally detects in a step 110 the type of input data being received by using the ID system or the keypad lookup table. The system can thus determine the color of marker used, whether an eraser or finger was used, whether the keypad was used, etc. In a step 115, the combination of data is processed by controller 78 and then relayed to interface 80, which formats the data into network packets using the appropriate network protocols (Ethernet, wireless, etc.). In a step 120, the network packets for this session are transmitted to server 52 for storage. Therefore, this data can be "streamed" to the server to be transmitted in substantial real time to other computers, and/or saved at server 52 for referral and documentation at a later time. As long as whiteboard 10 is plugged into (or uses wireless communication to) a network port, server 52 does not need to be physically located near the whiteboard and can be a server (like a web, email or print server) that is already available to support other functions as well.

Resident on the network server or web server 52 for electronic whiteboard 10 is software that reads and stores for later transmission the data sent by whiteboard 10 via a network port. If a network device requests a particular electronic whiteboard session in a step 125, this server software transmits it to users on network 50 as requested in a step 130. Server 52 is also normally left running at all times, allowing electronic whiteboard 10 (and multiple other similar networked whiteboards in other locations) to always be ready to record data in a meeting or to be accessed for previous meeting sessions.

In a specific embodiment, the electronic whiteboard server 52 will most commonly be accessed through a small computer application, most preferably a Java applet that loads into a user's web browser, that translates the data received from the server into the reproduced whiteboard meeting. The web browser access provides simplicity of use, as the user does not need to manually install a special piece of software but instead just types the correct Uniform Resource Locator (URL) into the web browser. This URL is the location on the network for the server storing a specific electronic whiteboard meeting (or for the electronic whiteboard itself if the whiteboard meeting is stored within the whiteboard memory). In this manner, the whiteboard data is accessible through any computer with a web browser that is Java-enabled, without the need to install specialized software. The system is also platform independent due to this setup. The above-described methods of entering a URL or making a request can be used by a network device to request the whiteboard session in accordance with step 125. The present invention thus enables viewing of substantially real-time data from the electronic whiteboard, or to review past sessions. In addition, a username and password can be assigned as needed to restrict access to some electronic whiteboard meetings. In some embodiments, the whiteboard meeting data could also be accessed from any computer application that can request the desired whiteboard session and read the data from the server.

At the network device of the accessing user, entering this URL loads a piece of software (e.g., a Java applet) to translate the whiteboard data into a form the user can understand, along with a user interface to navigate the data. The synchronization of the whiteboard drawing and audio will make it easier for a person to navigate through the meeting. For example the user can find an important bit of audio by remembering what state the whiteboard drawing was in when the important comment was made.

Particularly for embodiments where the whiteboard drawing data and audio data are saved on the server, the stored data can also be processed for easier searching capabilities. Software can be loaded onto server 52 that enables the writing on the board to be analyzed to make the data more easily searched. For example, the drawing data can be processed through handwriting or optical character recognition (OCR) software to create a list of words for keyword searches. The audio data can also be converted from speech to text, in order to create more search keywords. Dates, times and places of each whiteboard meeting session can be saved with the data for easier retrieval.

In alternative embodiments where the memory within control system 20 is sufficiently large, data input during a whiteboard meeting can be stored within whiteboard 10 and only sent to network 50 when/if a network device requests access. The network device could send a request packet which includes the requesting device's IP address and a session number of the particular meeting requested. Processor 78 in electronic whiteboard 10 could then directly serve the data over the network or Internet with whiteboard 10's own internal embedded web server. The particular meeting's data could be encapsulated into network packets and transmitted to individual users using the IP addresses from the request packet(s). Network packets could also be sent by the electronic whiteboard to groups of users belonging to a particular group multicast address, if the whiteboard is configured (e.g., using keypad to enter the multicast address) to send transmissions to a multicast group.

The above description of the various specific embodiment are not intended to unnecessarily limit the scope of the present invention, which is determined only by the metes and bounds of the following claims.

What is claimed is:

1. An electronic whiteboard comprising:
   a foam sensor with a plurality of electrodes;
   an erasable writing surface disposed on top of said foam sensor, said erasable writing surface having an input area;
   circuitry coupled to said electrodes, said circuitry measuring pressure and position data of a contact made to said input area of said writing surface; and
   an instrument identification system for identifying the type of instrument used to make said contact to said input area of said writing surface, wherein said circuitry further processes said identification as corresponding to said measured pressure and position data, said type of instrument being selected from a group comprising a particular color of a marker, a finger, and an eraser.

2. The electronic whiteboard according to claim 1 wherein said instrument identification system comprises radio frequency (RF) tag labels, and RF identification system disposed within a pen tray of said electronic whiteboard, wherein said passive RF tag labels identify said type of instrument as a particular color of a marker or an eraser to said RF identification system.

3. The electronic whiteboard according to claim 2 wherein:
   said foam sensor includes a first elastomer foam layer and two of said electrodes are disposed substantially parallel at opposite edges of said first elastomer foam layer.

4. The electronic whiteboard according to claim 3 wherein:
   said foam sensor also includes a second elastomer foam layer and another two of said electrodes are disposed substantially parallel at opposite edges of said second elastomer foam layer and substantially orthogonal to said two of said electrodes of said first elastomer foam layer, said second elastomer foam layer being in direct contact with said first elastomer foam layer under said input area.

5. The electronic whiteboard according to claim 4 wherein said first and second elastomer foam layers are comprised of a closed-cell and conductive elastomer foam material having a volume resistivity ranging from about 2500 to 10,000 ohm-cm and having a density of up to about 0.2 gm/cm$^3$.

6. The electronic whiteboard according to claim 2 further comprising:
   a network interface coupled to said circuitry, wherein said circuitry includes a processor for further processing and relays said measured pressure and position data to said network interface for transmission over a network.

7. The electronic whiteboard according to claim 2 further comprising:
   a microphone jack coupled to said circuitry, wherein said circuitry processes said measured pressure and position data with audio data received from said microphone jack such that said audio data is synchronized with said measured pressure and position data.

8. The electronic whiteboard according to claim 2 further comprising:
   a microphone coupled to said circuitry, wherein said circuitry processes said measured pressure and position data with audio received from said microphone such that said audio data is synchronized with said measured pressure and position data.

9. The electronic whiteboard according to claim 2 further comprising:

a key input pattern within said input area, said circuitry measuring pressure and position of a contact made to a key on said key input pattern and processing said contact according to a code corresponding to said key.

10. The electronic whiteboard according to claim 9 wherein:

said key input pattern comprises a keypad or a keyboard.

11. The electronic whiteboard according to claim 2, wherein said circuitry measures circuitry coupled to said electrodes, said circuitry can determine the size of a contact made to said input area of said writing surface by making current measurements.

12. The electronic whiteboard according to claim 11, wherein said circuitry measures circuitry coupled to said electrodes, said circuitry can determine whether more than one contact is made to said input area and then cause a warning to be issued.

13. An electronic whiteboard network appliance comprising:

a foam sensor with a plurality of electrodes;

an erasable writing surface disposed on top of said foam sensor, said erasable writing surface having an input area to which a contact having pressure and position data may be made;

an audio input such that audio data is synchronized with said pressure and position data;

circuitry coupled to said electrodes and said audio input, said circuitry measuring said pressure and position data of said contact and synchronizing said audio data to said measured pressure and position data;

a network interface coupled to said circuitry, said network interface transmitting said measured pressure and position data with synchronized audio data from said circuitry within network packets to a network for use at a network device; and an instrument identification system for identifying the type of instrument used to make said contact to said input area of said writing surface, wherein said circuitry further processes said identification as corresponding to said pressure and position data, said type of instrument being selected from a group comprising a particular color of a marker, a finger, and an eraser; wherein said instrument identification system comprises radio frequency (RF) tag labels and RF identification system disposed within a pen tray of said electronic whiteboard network appliance, wherein said passive RF tag labels identify said type of marker or eraser.

14. The electronic whiteboard network appliance according to claim 13 further comprising:

a key input pattern within said input area, said circuitry measuring pressure and position of a key contact made to said key input pattern and processing said contact according to a code corresponding to said key, wherein said key input pattern can be used to input an IP address.

15. The electronic whiteboard network appliance according to claim 14 wherein said IP address can be input to configure an address representing said electronic whiteboard, to address said network packets to a server on said network, and/or to address said network packets to devices on said network.

16. The electronic whiteboard network appliance according to claim 13 wherein said circuitry is provided with sufficient memory to store said measured pressure and position data with synchronized audio data for at least one session.

17. The electronic whiteboard network appliance according to claim 13 wherein said network interface comprises a removable network interface module.

18. An electronic whiteboard meeting system over a network comprising an electronic whiteboard encoding system including a network interface, said electronic whiteboard encoding system measuring pressure and position data from contacts made during an electronic whiteboard meeting to a writing surface of said electronic whiteboard encoding system, wherein said writing surface of said electronic whiteboard encoding system includes a foam sensor, and said electronic whiteboard encoding system includes an instrument identification system for identifying the type of instrument used to make said contact to said input area of said writing surface, said type of instrument being selected from a group comprising a particular color of a marker, a finger, and an eraser, and wherein said electronic whiteboard encoding system transmits said position data in network packets via said network interface to said network;

a network server connected to said network, said network server installed with server software capable of reading and storing said position data for transmission over said network;

a plurality of devices logically connected to said network, at least one device of said plurality of devices provided with client software capable of accessing and translating said position data from said network server into a representation of said electronic whiteboard meeting; and wherein said instrument identification system comprises radio frequency (RF) tag labels and RF identification system disposed within a pen tray of said electronic whiteboard network appliance, wherein said passive RF tag labels identify said type of marker or eraser.

19. The electronic whiteboard meeting system according to claim 18, wherein said client software comprises a Java applet loaded on a web browser when entering a particular Uniform Resource Locator (URL) for a network location of said electronic whiteboard meeting stored on said network server.

20. The electronic whiteboard meeting system according to claim 18, wherein said server software also is capable of processing said position data into keywords and searching for a particular one of said keywords in said electronic whiteboard meeting.

21. The electronic whiteboard meeting system according to claim 18, wherein said electronic whiteboard encoding system also receives audio data corresponding to said position data from contacts made during said electronic whiteboard meeting, synchronizes said audio data to said position data, and transmits said position data and said synchronized audio data in said network packets;

wherein said server software is also capable of reading and storing said synchronized audio data for transmission over said network;

wherein said client software is also capable of accessing and translating said synchronized audio data from said network server into a representation of said electronic whiteboard meeting.

22. The electronic whiteboard meeting system according to claim 21, wherein said server software also is capable of processing said position data and audio data into keywords and searching for a particular one of said keywords in said electronic whiteboard meeting.

23. The electronic whiteboard meeting system according to claim 21, wherein said client software comprises a Java applet loaded on a web browser when entering a particular Uniform Resource Locator (URL) for a network location of said electronic whiteboard meeting stored on said network server.

24. The electronic whiteboard meeting system according to claim 21 wherein said electronic whiteboard encoding system comprises an electronic whiteboard network appliance.

25. The electronic whiteboard meeting system according to claim 18 wherein said electronic whiteboard encoding system comprises an electronic whiteboard network appliance.

\* \* \* \* \*